W. H. HART.
KEEPER FOR HASPS.
APPLICATION FILED DEC. 14, 1914.
1,141,542.
Patented June 1, 1915.
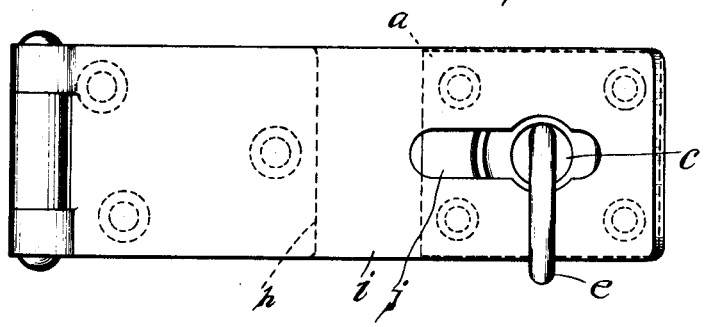
Fig.1.
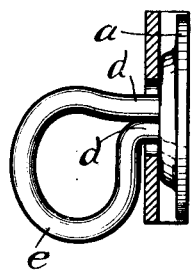
Fig.2.
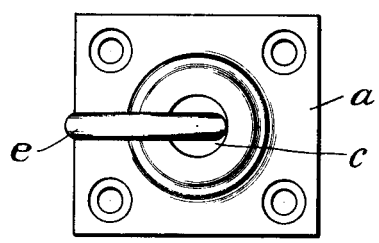
Fig.3.
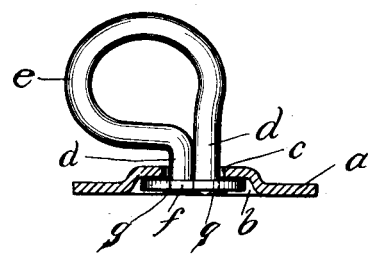
Fig.4.
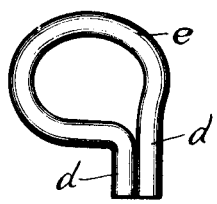
Fig.5.
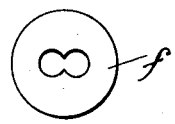
Fig.6.
WITNESSES:
INVENTOR.
Walter H. Hart.
BY
ATTORNEY.

UNITED STATES PATENT OFFICE.

WALTER H. HART, OF NEW BRITAIN, CONNECTICUT, ASSIGNOR TO THE STANLEY WORKS, OF NEW BRITAIN, CONNECTICUT, A CORPORATION OF CONNECTICUT.

KEEPER FOR HASPS.

1,141,542.     Specification of Letters Patent.     Patented June 1, 1915.

Application filed December 14, 1914. Serial No. 877,000.

*To all whom it may concern:*

Be it known that I, WALTER H. HART, a citizen of the United States, and a resident of New Britain, in the county of Hartford and State of Connecticut, have invented certain new and useful Improvements in Keepers for Hasps, of which the following is a specification.

The object of this invention is to produce a device of the character described, of increased strength and peculiarly adapted for operation in connection with a safety hasp such as is used for the securing of doors and the like.

Figure 1 is a plan view of a complete safety hasp made in accordance with my invention. Fig. 2 is a sectional end view thereof. Fig. 3 is a plan view of the swivel. Fig. 4 is a side view thereof, with the base plate in section. Fig. 5 is a detail view of the swivel eye. Fig. 6 is a plan view of the washer to which the swivel is connected.

Referring to the drawings, *a* denotes the base plate chambered as at *b*, and in its chambered portion apertured as at *c* to receive the two shanks *d, d,* of the swivel *e.*

*f* is a washer apertured to receive the shanks *d, d,* which are riveted over as at *g, g.*

*h* denotes the fixed plate of the hasp which is fastened to the structure, and *i* the swinging leaf having the longitudinally arranged swivel-receiving aperture *j.*

The swivel *e* as shown is of overbalanced construction so that it will always hang down in locking position, as clearly shown in Figs. 1 and 2.

The depth of the chamber *b* in the base plate *a* is sufficient to leave ample clearance for the free movement of the washer when the swivel is turned, and there is sufficient play here and in the aperture *c* to leave the swivel operative in case the door or other part to which the device is secured should sag or warp. The double shank swivel not only adds materially to the strength but produces a better balanced and freer-acting swivel than has heretofore been possible. The strains to which a safety hasp swivel are subject are more in the nature of cramping strains, and in consequence necessitate the provision of special and peculiar structural features to provide a swivel which will withstand the unusual strains and under all conditions work satisfactorily.

I claim as my invention:

In a safety hasp, the combination with the hasp leaf longitudinally slotted, of a swivel comprising a chambered base, a washer located within the chamber, and a swivel provided with double shanks which pass through an aperture in and are rotatable with respect to the base, the ends of said shanks passing through said washer being riveted over, connecting them to the said washer to cause the two parts to move together, the depth of the chamber in said base being greater than the thickness of said washer to permit free play of said washer with respect to said base.

WALTER H. HART.

Witnesses:
A. W. AUSTIN,
W. C. MILKEY.